(12) United States Patent
Whitmire et al.

(10) Patent No.: US 10,665,243 B1
(45) Date of Patent: May 26, 2020

(54) SUBVOCALIZED SPEECH RECOGNITION

(71) Applicant: Facebook Technologies, LLC, Menlo Park, CA (US)

(72) Inventors: Eric Michael Whitmire, Redmond, WA (US); Laura Cristina Trutoiu, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 235 days.

(21) Appl. No.: 15/791,295

(22) Filed: Oct. 23, 2017

Related U.S. Application Data

(60) Provisional application No. 62/420,834, filed on Nov. 11, 2016.

(51) Int. Cl.
| | |
|---|---|
| *G10L 15/25* | (2013.01) |
| *G06F 3/16* | (2006.01) |
| *G10L 15/32* | (2013.01) |
| *G10L 15/187* | (2013.01) |
| *G10L 15/14* | (2006.01) |

(52) U.S. Cl.
CPC .............. *G10L 15/25* (2013.01); *G06F 3/167* (2013.01); *G10L 15/142* (2013.01); *G10L 15/187* (2013.01); *G10L 15/32* (2013.01)

(58) Field of Classification Search
CPC ..... G10L 15/25; G10L 15/142; G10L 15/187; G10L 15/32; G06F 3/167
See application file for complete search history.

(56) References Cited

U.S. PATENT DOCUMENTS

| | | | | |
|---|---|---|---|---|
| 5,937,384 A | * | 8/1999 | Huang | G06K 9/6297 |
| | | | | 704/251 |
| 6,487,531 B1 | * | 11/2002 | Tosaya | G10L 15/20 |
| | | | | 704/223 |
| 7,181,391 B1 | * | 2/2007 | Jia | G10L 15/18 |
| | | | | 704/231 |
| 8,364,486 B2 | * | 1/2013 | Basir | G10L 15/02 |
| | | | | 704/254 |
| 9,564,128 B2 | * | 2/2017 | Park | G10L 15/24 |
| 9,977,496 B2 | * | 5/2018 | Maltz | G06F 3/013 |
| 9,984,683 B2 | * | 5/2018 | Li | G10L 15/16 |
| 2006/0074656 A1 | * | 4/2006 | Mathias | G10L 15/063 |
| | | | | 704/243 |
| 2007/0106501 A1 | * | 5/2007 | Morita | G06F 3/015 |
| | | | | 704/200 |
| 2008/0288022 A1 | * | 11/2008 | Van der Borght | H04R 25/43 |
| | | | | 607/57 |
| 2009/0010456 A1 | * | 1/2009 | Goldstein | H04R 25/02 |
| | | | | 381/110 |

(Continued)

*Primary Examiner* — Fariba Sirjani
(74) *Attorney, Agent, or Firm* — Fenwick & West LLP

(57) ABSTRACT

A system for subvocalized speech recognition includes a plurality of sensors, a controller and a processor. The sensors are coupled to a near-eye display (NED) and configured to capture non-audible and subvocalized commands provided by a user wearing the NED. The controller interfaced with the plurality of sensors is configured to combine data acquired by each of the plurality of sensors. The processor coupled to the controller is configured to extract one or more features from the combined data, compare the one or more extracted features with a pre-determined set of commands, and determine a command of the user based on the comparison.

18 Claims, 4 Drawing Sheets

(56) References Cited

U.S. PATENT DOCUMENTS

| | | | | |
|---|---|---|---|---|
| 2009/0175478 | A1* | 7/2009 | Nakajima | H04R 1/46 381/361 |
| 2009/0234651 | A1* | 9/2009 | Basir | G10L 15/02 704/254 |
| 2009/0254350 | A1* | 10/2009 | Kondou | G10L 15/24 704/274 |
| 2010/0085446 | A1* | 4/2010 | Thorn | G06F 3/011 348/239 |
| 2011/0224981 | A1* | 9/2011 | Miglietta | G10L 15/26 704/235 |
| 2013/0208234 | A1* | 8/2013 | Lewis | G06F 3/011 351/158 |
| 2013/0343585 | A1* | 12/2013 | Bennett | H04R 25/554 381/315 |
| 2014/0342324 | A1* | 11/2014 | Ghovanloo | G09B 5/06 434/185 |
| 2015/0100313 | A1* | 4/2015 | Sharma | G06F 3/167 704/235 |
| 2015/0161998 | A1* | 6/2015 | Park | G10L 15/24 704/231 |
| 2015/0230019 | A1* | 8/2015 | Sakai | H04R 1/1041 381/74 |
| 2016/0004306 | A1* | 1/2016 | Maltz | G06F 3/013 345/173 |
| 2017/0116995 | A1* | 4/2017 | Ady | G10L 17/24 |
| 2018/0025721 | A1* | 1/2018 | Li | G10L 15/16 704/232 |
| 2019/0182415 | A1* | 6/2019 | Sivan | H04W 4/80 |

* cited by examiner

SUBVOCALIZED SPEECH RECOGNITION

CROSS REFERENCE TO RELATED APPLICATIONS

This application claims the benefit of U.S. Provisional Application No. 62/420,834, filed Nov. 11, 2016, which is incorporated by reference in its entirety.

TECHNICAL FIELD

The present disclosure generally relates to speech recognition, and specifically relates to implementation of subvocalized speech recognition.

BACKGROUND

In certain applications, non-audible and subvocalized speech (e.g., mouthed speech, murmur, whisper, and the like) can be used as an input into an artificial reality system. When privacy is required, a user may employ mouthed and subvocalized commands as inputs into the artificial reality systems without disrupting other people in vicinity of the user. Furthermore, in noisy environments (e.g., busy restaurants), commands provided by a user of the artificial reality system may sound as subvocalized due to a large level of noise. In addition, in military and police applications where artificial reality systems can be employed, it can be crucial to keep acoustic signatures low and provide interface with other system(s) making low level of noise. Therefore, it is desirable to implement an accurate and socially acceptable system for non-audible and subvocalized speech recognition that can be efficiently integrated into the artificial reality system.

SUMMARY

A system for subvocalized speech recognition includes a plurality of sensors that detect mouthed and subvocalized (e.g., murmur, whisper, etc.) commands provided by a user. The plurality of sensors are coupled to an eyeglass-type platform representing a near-eye-display (NED). The NED may be part of an artificial reality system. Here, the plurality of sensors are configured to capture non-audible and subvocalized commands by a user. The plurality of sensors include sensors that can detect commands (e.g., a camera, in-ear proximity sensor) when no audible sound is detected (i.e., user mouths a command) and other sensors (e.g., a non-audible murmur (NAM) microphone and an air microphone) that can detect subvocalizations of a user (e.g., user murmurs/whispers the command). Data from the sensors is collected and processed using machine learning techniques, to extract features and identify one or more commands provided by the user. The system allows for users to interact with systems in a private manner and/or in noisy environments.

The system for subvocalized speech recognition includes a controller interfaced with the plurality of sensors. The controller is configured to combine data acquired by each of the plurality of sensors. The system further comprises a processor (e.g., machine learning module) configured to extract one or more features from the combined data, compare the one or more extracted features with a pre-determined set of commands, and determine one or more commands of the user based on the comparison. In some embodiments, the system performs feature extraction on the combined data based on machine learning to determine the one or more non-audible and/or subvocalized commands, i.e., to match features of the combined data acquired via the plurality of sensors with one of a plurality of pre-defined phrases (commands). In one embodiment, the machine learning technique for feature extraction is based on the frame-based classification of the combined data. In another embodiment, the machine learning technique for feature extraction is based on the sequence-based classification of the combined data. In yet another embodiment, the machine learning technique for feature extraction is based on the sequence-to-sequence phoneme classification of the combined data.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a near-eye-display (NED) connected to a host computer system, a head-mounted-display (HMD) connected to a host computer system, a standalone NED, a standalone HMD, a mobile device or computing system, or any other hardware platform capable of providing artificial reality content to one or more viewers.

Disclosed embodiments include implementation of a subvocalized speech recognition system, which may be used as part of an artificial reality system. The subvocalized speech recognition system comprises a collection of sensors that are configured to detect non-audible and subvocalized speech, such as speech between mouthing and whispering that normally would not be detected. In some embodiments, the subvocalized speech recognition system is designed to fit on a sunglasses-type platform that may be used as an artificial reality platform. Data from the collection of sensors are combined and processed using machine learning techniques to determine commands provided by a user operating the subvocalized speech recognition system.

Figure 1:
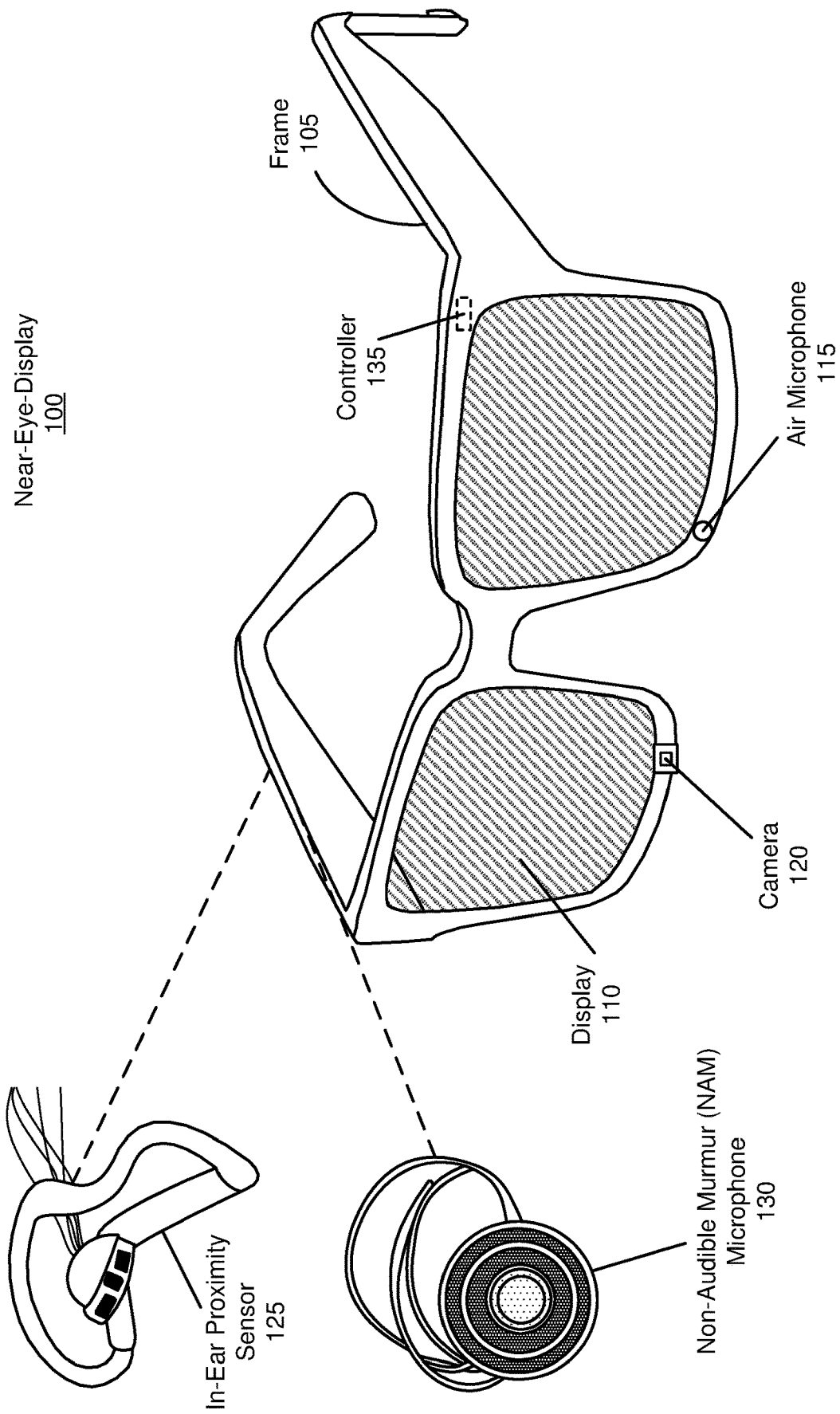
FIG. 1 is a diagram of a near-eye-display (NED) with a plurality of sensors for subvocalized speech recognition, in accordance with an embodiment.

FIG. 1 is a diagram of a near-eye-display (NED) 100 coupled with a plurality of sensors for subvocalized speech recognition, in accordance with an embodiment. The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 is generally configured to operate as a VR NED. However, in some embodiments, the NED 100 may be modified to also operate as an AR NED, a MR NED, or some combination thereof. For example, in some embodiments, the NED 100 may augment views of a physical, real-world environment with computer-generated elements (e.g., images, video, sound, etc.).

The NED 100 shown in FIG. 1 includes a frame 105 and a display 110. The frame 105 includes one or more optical elements which together display media to users. The display 110 is configured for users to see the content presented by the NED 100. As discussed below in conjunction with FIG. 2, the display 110 includes at least one source assembly to generate an image light to present media to an eye of the user. The source assembly includes, e.g., a source, an optics system, or some combination thereof.

The NED 100 shown in FIG. 1 is only an example of an artificial reality system. However, in alternate embodiments, the NED 100 may also be referred to as a HMD.

In some embodiments, the NED 100 includes a plurality of sensors configured to monitor and detect subvocalized and/or non-audible commands from a user wearing the NED 100. As illustrated in FIG. 1, the NED 100 may include an air microphone 115, a camera 120, an in-ear proximity sensor 125, and a non-audible murmur (NAM) microphone 130. The plurality of sensors coupled to the NED 100 shown in FIG. 1 are chosen as they are appropriate for glasses-style artificial reality systems, require minimal preparation for accurate operation and correlate well with non-audible and subvocalized speech.

In some embodiments, the air microphone 115 is located at the frame 105 near user's mouth to detect user's whisper and other types of subvocalized speech. In an embodiment, the air microphone 115 comprises an array of microphones (not shown in FIG. 1). The air microphone 115 can be configured to be especially efficient in low noise environments. However, the air microphone 115 can be quickly overpowered by an ambient noise if used in isolation without other subvocalized and non-audible speech recognition sensors presented herein.

In some embodiments, the camera 120 is integrated in the frame 105 in proximity of user's mouth for capturing images of user's lips. The camera 120 can be configured for detecting non-audible speech based on lip reading, as the camera 120 is oriented toward the user's mouth for capturing a profile view of user's lips. In some embodiments, as discussed in more detail below, data collected by the camera 120 can be of most value for detecting mouthed and non-audible user's commands. For example, a video signal provided by the camera 120 related to a profile view of user's lips can increase accuracy of non-audible and subvocalized speech recognition.

In some embodiments, the in-ear proximity sensor 125 is located inside an ear canal of a user wearing the NED 100. The in-ear proximity sensor 125 can be coupled to the frame 105 of the NED 100 via a wired or wireless interface connection. The in-ear proximity sensor 125 is configured to detect non-audible (i.e., mouthed) speech based on measuring deformations of the ear canal when the user moves a jaw during the non-audible speech. As the user's jaw moves, the ear canal deforms and increases a volume of a space between the in-ear proximity sensor 125 and an inside wall of the ear canal. The in-ear proximity sensor 125 registers increase of the this volume as the user moves the jaw during the non-audible speech, and collects information about changes in the volume over time as the user provides non-audible commands.

In some embodiments, the NAM microphone 130 is placed behind a user's ear and it is designed to sit against a user's skin. The NAM microphone 130 can be coupled to the frame 105 of the NED 100 via a wired or wireless interface connection. The NAM microphone 130 is configured to measure vibrations in the user's skin during user's mouthed and subvocalized speech. In one or more embodiments, the NAM microphone 130 can be configured to suppress an ambient noise, which makes the NAM microphone 130 very efficient in noisy environments (e.g., busy restaurants) although some high frequency components of subvocalized speech may be lost. In an embodiment, the NAM microphone 130 acts as a low pass filter having a low bandwidth of, for example, 1.5 kHz.

In some embodiments, as shown in FIG. 1, the NED 100 may further comprise a controller 135 coupled to the frame 105, which may be configured to combine information about subvocalized and non-audible speech acquired by the air microphone 115, the camera 120, the in-ear proximity sensor 125, and the NAM microphone 130. The controller 135 is configured to properly integrate together data with various different features collected by different types of sensors mounted and interfaced to the NED 100. The controller 135 also provides the combined data for further processing for feature extraction using various feature extraction techniques, as discussed in more detail below. The goal of the feature extraction is to determine if the data acquired from various sensors during subvocalized and/or non-audible speech correspond to one or more phrases (commands) from a set of pre-defined phrases.

Figure 2:
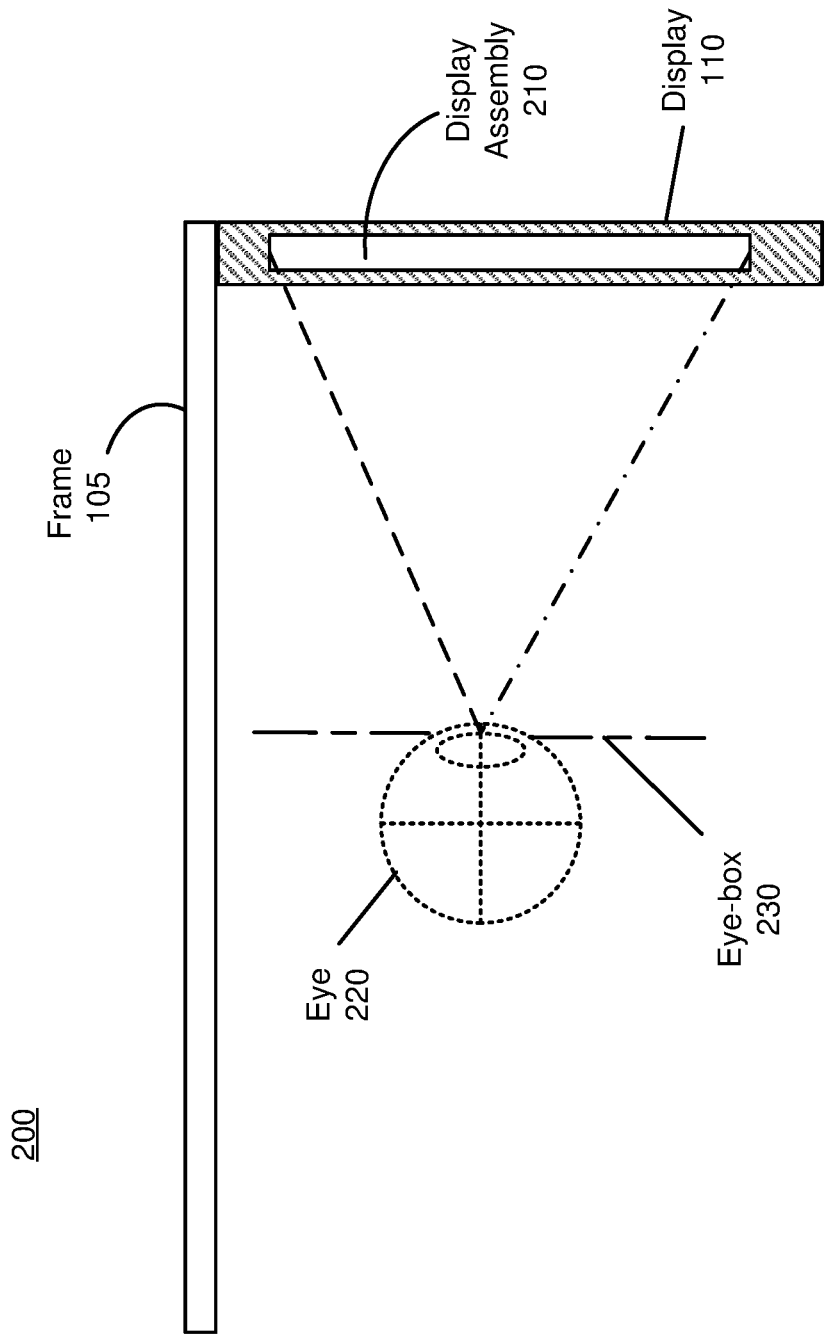
FIG. 2 is a cross-section of an eyewear of the NED illustrated in FIG. 1, in accordance with an embodiment.

FIG. 2 is a cross section 200 of the NED 100 illustrated in FIG. 1, in accordance with an embodiment. The cross section 200 includes at least one display assembly 210, and an eye-box 230. The eye-box 230 is a location where the eye 220 is positioned when the user wears the NED 100. In some embodiments, the frame 105 may represent a frame of eye-wear glasses. For purposes of illustration, FIG. 2 shows the cross section 200 associated with a single eye 220 and a single display assembly 210, but in alternative embodiments not shown, another display assembly which is separate from the display assembly 210 shown in FIG. 2, provides image light to another eye 220 of the user.

The display assembly 210, as illustrated below in FIG. 2, is configured to direct the image light to the eye 220 through the eye-box 230. The display assembly 210 may be composed of one or more materials (e.g., plastic, glass, etc.) with one or more refractive indices that effectively minimize the weight and widen a field of view (hereinafter abbreviated as 'FOV') of the NED 100. In alternate configurations, the NED 100 includes one or more optical elements between the display assembly 210 and the eye 220. The optical elements may act to, e.g., correct aberrations in image light emitted from the display assembly 210, magnify image light emitted from the display assembly 210, some other optical adjustment of image light emitted from the display assembly 210, or some combination thereof. The example for optical elements may include an aperture, a Fresnel lens, a convex lens, a concave lens, a filter, or any other suitable optical element that affects image light.

In some embodiments, the display assembly 210 may include a source assembly to generate an image light to present media to user's eyes. The source assembly includes, e.g., a source, an optics system, or some combination thereof.

Figure 3:
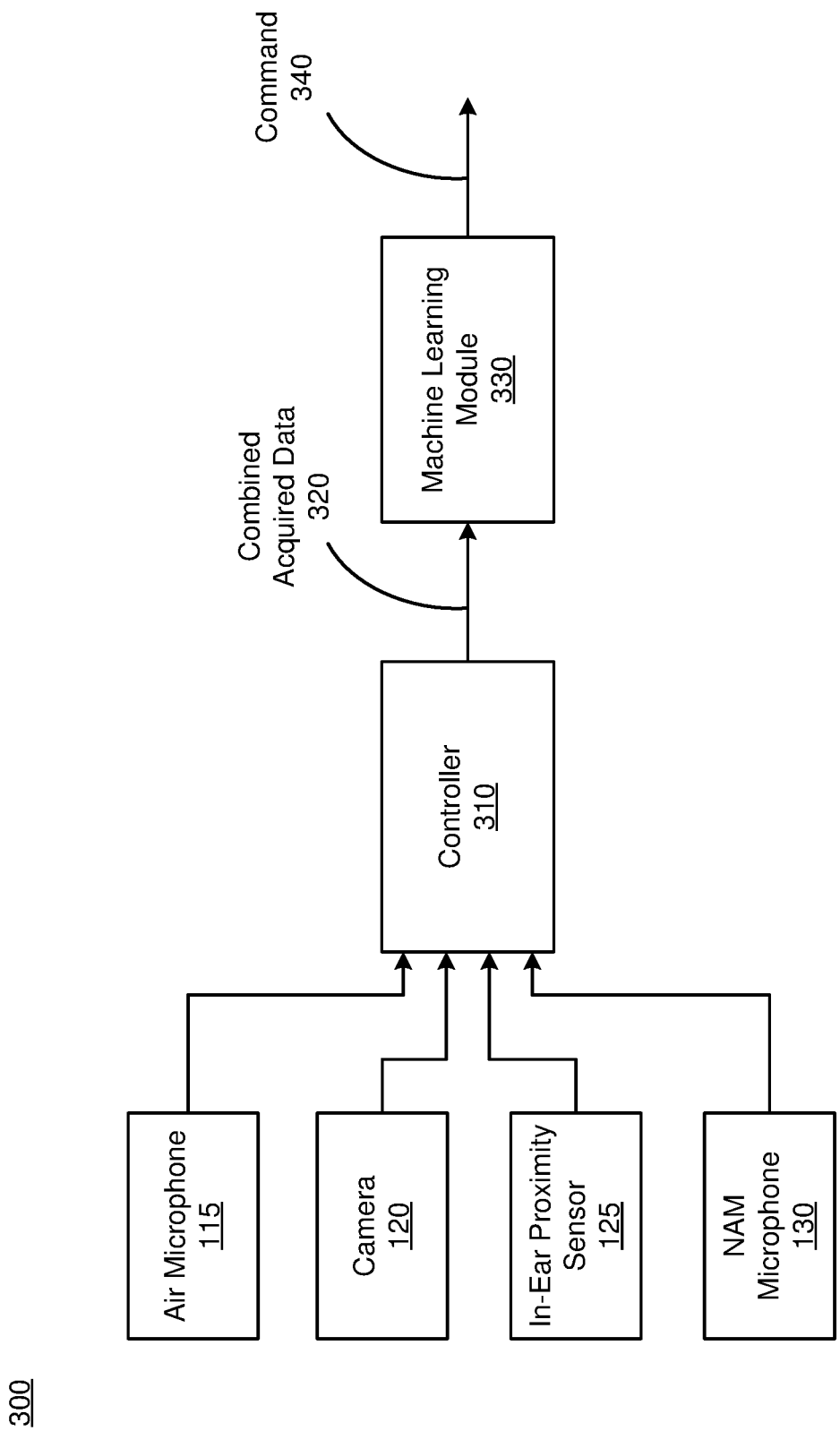
FIG. 3 is a block diagram of a system environment for subvocalized speech recognition, in accordance with an embodiment.

FIG. 3 is a block diagram of a system environment 300 for subvocalized speech recognition that collects and processes information about subvocalized and/or non-audible speech acquired by various sensors mounted and interfaced to the NED 100 shown in FIG. 1, e.g., the air microphone 115, the camera 120, the in-ear proximity sensor 125, and the NAM microphone 130. In some embodiments, the system environment 300 is part of the NED 100.

A controller 310 is interfaced (e.g., via a wired or wireless connection) with the air microphone 115, the camera 120, the in-ear proximity sensor 125, and the NAM microphone 130 shown in FIG. 1. The controller 310 is configured to collect and combine data acquired by the various sensors mounted and interfaced with the NED 100. Resulting data 320 at the output of the controller 310 comprise different features acquired by the various sensors. In some embodiments, the controller 310 is an embodiment of the controller 135 shown in FIG. 1.

In some embodiments, the data 320 comprising various different features acquired by the air microphone 115, the camera 120, the in-ear proximity sensor 125, and the NAM microphone 130 is processed for feature extraction in order to determine one or more non-audible and/or subvocalized commands of a user. In one or more embodiments, the feature extraction processing is based on one or more machine learning techniques that classify a sequence of data 320 into one phrase (or command) out of a pre-determined number of phrases (or commands). As shown in FIG. 3, the data 320 comprising features acquired by the various sensors are input into a machine learning module (i.e., processor) 330 configured to extract features from the data 320 and determine a phrase (command) 340 that corresponds to non-audible or subvocalized speech. In an illustrative embodiment, the data 320 collected by the controller 310 may comprise 65 different features of the non-audible and subvocalized speech, wherein 26 features are obtained by the air microphone 115, 24 features are obtained by the camera 120, three features are obtained by the in-ear proximity sensor 125, and 12 features are obtained by the NAM microphone 130.

In some embodiments, the data 320 are different from regular speech recognition data, as the data 320 related to mouthed and subvocalized speech typically vary even for the same commands and do not have a consistent pattern that could be used for modeling of machine learning process. Thus, a machine learning technique performed by the machine learning module 330 is robust in order to accurately match the non-audible and/or subvocalized data 320 with one or more phrases (commands) 340.

In one embodiment, the machine learning module 330 is configured to perform a frame-based classification in order to classify a sequence of the data 320 into a phrase (command) 340 that corresponds to a non-audible/subvocalized speech. For the frame-based classification, a support vector machine (SVM) sub-module of the machine learning module 330 can classify each frame of the data 320 as one of N possible pre-defined phrases (commands), based on different features in the data 320.

The classification accuracy of the machine learning based on the frame-based classification greatly depends on what sensors being mounted and interfaced to the NED 100 are actually utilized for non-audible and subvocalized speech recognition. In an illustrative embodiment, if only audio sensors for subvocalized/whispered speech recognition are employed (e.g., the air microphone 115 and the NAM microphone 130), the whispered accuracy and the subvocalized accuracy are lower than that obtained if both audio and video sensors are employed (e.g., the air microphone 115, the NAM microphone 130, and the camera 120). On the other hand, if audio, video and proximity sensors are used (e.g., the air microphone 115, the NAM microphone 130, the camera 120, and the in-ear proximity sensor 125), the resultant whispered accuracy is similar to that obtained if both audio and video sensors are employed while the subvocalized accuracy is further increased.

In another embodiment, the machine learning module 330 is configured to perform a sequence-based classification in order to classify a sequence of the data 320 into a phrase (command) 340 that corresponds to a non-audible/subvocalized speech. For the sequence-based classification, a Hidden Markov Model run by the machine learning module 330 can analyze a sequence of the data 320 and classify that sequence as one of N possible pre-determined phrases (commands) 340. For classification of the acquired data 320 into N possible phrases, N Hidden Markov Models are trained. To accurately classify a sequence of the acquired data 320 into an appropriate phrase, a preferred Hidden Markov Model is chosen that best explains observed features of the data 320 among the N different Hidden Markov Models.

The classification accuracy of the machine learning based on the sequence-based classification also greatly depends on what sensors being mounted and interfaced to the NED 100 are actually utilized for non-audible and subvocalized speech recognition. In an illustrative embodiment, if only ear sensors are used (e.g., the in-ear proximity sensor 125 and the NAM microphone 130), the classification accuracy of the sequence-based classification is lower than that obtained if both video and ear sensors are used (e.g., the camera 120 in addition to the in-ear proximity sensor 125 and the NAM microphone 130). The classification accuracy of the sequence-based classification is further increased if the air microphone 115 is also employed along with the camera 120, the in-ear proximity sensor 125, and the NAM microphone 130.

In yet another embodiment, the machine learning module 330 is configured to perform the sequence-to-sequence phoneme classification in order to classify a sequence of the data 320 into a phrase (command) 340 that corresponds to a non-audible/subvocalized speech. For performing the sequence-to-sequence phoneme classification, the machine learning module 330 includes an acoustic model and a language model trained for non-audible and subvocalized speech recognition. The acoustic model is based on recurrent neural network (RNN) architecture, whereas the language model can be efficiently trained using n-gram model. The machine learning module 330 runs RNN of the acoustic model that maps an input sequence of the data 320 (that includes a time series of features) into a phoneme sequence.

The obtained phoneme sequence is then input into the trained language model. The language model applied after the acoustic model maps the phoneme sequence into a text (phrase) of the command 340.

Figure 4:
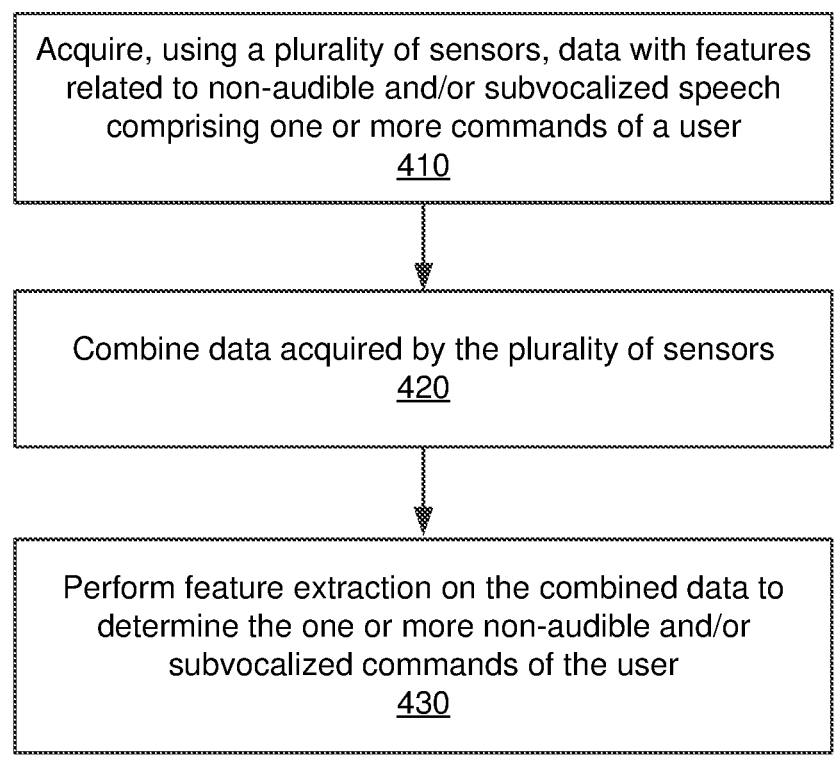
FIG. 4 is a flow chart illustrating a process of subvocalized speech recognition, in accordance with an embodiment.

FIG. 4 is a flow chart illustrating a process 400 of subvocalized speech recognition, in accordance with an embodiment. The process 400 of FIG. 4 may be performed by the system 300 in FIG. 3. Other entities may perform some or all of the steps of the process in other embodiments. Likewise, embodiments may include different and/or additional steps, or perform the steps in different orders.

The system 300 acquires 410 data (e.g., using a plurality of sensors integrated into the system 300, such as the air microphone 115, the camera 120, the in-ear proximity sensor 125, and NAM microphone 130) with features related to non-audible and/or subvocalized speech comprising one or more commands of a user. In an embodiment, the system 300 acquires 410 data via the plurality of sensors as the user provides the one or more non-audible and/or subvocalized commands to an artificial reality system where the system 300 is integrated.

The system 300 combines 420 (e.g., via the controller 310) data acquired by the plurality of sensors. In an embodiment, the data are combined such that to protect all the features related to non-audible and/or subvocalized speech acquired by each individual sensor of the plurality of sensors. The system 300 further provides the combined data acquired via the plurality of sensors for processing and feature extraction to determine the one or more non-audible and/or subvocalized commands of the user.

The system 300 performs 430 (e.g., via the machine learning module 330) feature extraction on the combined data to determine the one or more non-audible and/or subvocalized commands of the user. In some embodiments, the system 300 performs 430 the machine learning to match the combined data acquired by the plurality of sensors with one of a plurality of pre-defined phrases (commands). In one embodiment, the machine learning technique for feature extraction is based on the frame-based classification of the combined data. In another embodiment, the machine learning technique for feature extraction is based on the sequence based classification of the combined data. In yet another embodiment, the machine learning technique for feature extraction is based on the sequence-to-sequence phoneme classification of the combined data.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system for subvocalized speech recognition, the system comprising:
a plurality of sensors coupled to a near-eye display (NED) configured to capture non-audible and subvocalized commands provided by a user wearing the NED, the plurality of sensors comprising an air microphone, a camera, and a non-audible murmur (NAM) microphone,
the camera oriented toward a mouth of the user and configured to:
generate one or more video signals from capturing a profile view of lips of the user, and
detect a non-audible speech based on movement of the lips in the one or more video signals,
the NAM microphone configured to:
sit against a skin behind an ear of the user, and
measure vibrations in the skin during a mouthed subvocalized speech by the user;
a controller interfaced with the plurality of sensors configured to combine data acquired by all the sensors; and
a processor coupled to the controller, the processor configured to:
extract one or more features from the combined data,
compare the one or more extracted features with a pre-determined set of commands, determine a command of the user based on the comparison, the command provided by the user to the NED as a whisper in a subvocalized manner, and provide the command to the NED for operating the NED, the NED being a part of an artificial reality system and the commands are directed at the artificial reality system.

2. The system of claim 1, wherein the plurality of sensors further comprising an in-ear proximity sensor.

3. The system of claim 1, wherein the camera is integrated in a frame of the NED in proximity of the mouth for capturing images of the lips.

4. The system of claim 2, wherein the in-ear proximity sensor is located inside an ear canal of the ear.

5. The system of claim 4, wherein the in-ear proximity sensor is coupled to a frame of the NED and is configured to measure one or more deformations of the ear canal when the user moves a jaw during the non-audible speech.

6. The system of claim 1, wherein the NAM microphone is coupled to a frame of the NED.

7. The system of claim 1, wherein the processor is further configured to perform a frame-based classification to classify a sequence of the combined data into the command based on the extracted one or more features.

8. The system of claim 1, wherein the processor is further configured to perform a sequence-based classification to classify a sequence of the combined data into the command based on a hidden Markov model associated with the extracted one or more features.

9. The system of claim 1, wherein the processor is further configured perform a sequence-to-sequence phoneme classification to classify a sequence of the combined data into the command based on an acoustic model and a language model.

10. The system of claim 9, wherein the acoustic model is configured as a recurrent neural network.

11. The system of claim 9, wherein the language model is trained using an n-gram model.

12. The system of claim 9, wherein the processor is further configured to:

run the acoustic model to map the sequence of the combined data into a phoneme sequence; and map the phoneme sequence into the command using the language model.

13. A system configured to:

acquire, by a plurality of sensors coupled to a near-eye display (NED), data with features related to non-audible and subvocalized commands provided by a user, the plurality of sensors comprising an air microphone, a camera, and a non-audible murmur (NAM) microphone, the camera oriented toward a mouth of the user and configured to:

generate one or more video signals from capturing a profile view of lips of the user, and detect a non-audible speech based on movement of the lips in the one or more video signals, the NAM microphone configured to:

sit against a skin behind an ear of the user, and measure vibrations in the skin during a mouthed subvocalized speech by the user;

combine data acquired by all the sensors;

perform feature extraction on the combined data based on machine learning to determine a command of the user, the command provided by the user to the NED as a whisper in a subvocalized manner; and provide the commands to an artificial reality system for operating the artificial reality system, the NED being a part of the artificial reality system.

14. The system of claim 13, wherein the plurality of sensors further comprising an in-ear proximity sensor.

15. The system of claim 13, wherein the camera is integrated in a frame of the NED in proximity of the mouth for capturing images of the lips.

16. The system of claim 14, wherein the in-ear proximity sensor is configured to measure one or more deformations of an ear canal of the ear when the user moves a jaw during the non-audible speech.

17. The system of claim 13, wherein the system is further configured to perform a sequence-based classification to classify a sequence of the combined data into the command based on a hidden Markov model associated with the extracted features of the combined data.

18. The system of claim 13, wherein the system is further configured perform a sequence-to-sequence phoneme classification to classify a sequence of the combined data into the command based on an acoustic model and a language model.

* * * * *

UNITED STATES PATENT AND TRADEMARK OFFICE
CERTIFICATE OF CORRECTION

PATENT NO. : 10,665,243 B1  
APPLICATION NO. : 15/791295  
DATED : May 26, 2020  
INVENTOR(S) : Whitmire et al.

Page 1 of 1

It is certified that error appears in the above-identified patent and that said Letters Patent is hereby corrected as shown below:

In the Claims

In Column 9, in Claim 9, Line 32, after "configured" insert -- to --.

In Column 10, in Claim 18, Line 40, after "configured" insert -- to --.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*